(12) United States Patent
Vacherand et al.

(10) Patent No.: US 7,369,036 B1
(45) Date of Patent: May 6, 2008

(54) METHOD AND SYSTEM OF INFORMATION EXCHANGE BETWEEN AN INTERROGATOR DEVICE AND TRANSPONDER DEVICES THAT TAKES INTO ACCOUNT THE LEVEL OF AMBIENT NOISE

(75) Inventors: Francois Vacherand, Le Pout de Claix (FR); Elisabeth Crochon, Poisat (FR)

(73) Assignee: Commissariat a l'Energie Atomique, Paris (FR)

( * ) Notice: Subject to any disclaimer, the term of this patent is extended or adjusted under 35 U.S.C. 154(b) by 368 days.

(21) Appl. No.: 10/129,832

(22) PCT Filed: Nov. 7, 2000

(86) PCT No.: PCT/FR00/03092

§ 371 (c)(1),
(2), (4) Date: Sep. 16, 2002

(87) PCT Pub. No.: WO01/35320

PCT Pub. Date: May 17, 2001

(30) Foreign Application Priority Data

Nov. 8, 1999 (FR) .................................. 99 13983

(51) Int. Cl.
*H04Q 7/00* (2006.01)
*G05B 23/02* (2006.01)
(52) U.S. Cl. ................. 340/10.1; 340/10.2; 340/10.33; 340/3.51
(58) Field of Classification Search ............... 340/10.1, 340/10.2, 10.33, 3.51, 572.1, 825.08, 825.34, 340/825.49, 573.1, 573.4, 5.61–5.63; 701/300; 342/42; 370/346; 395/750; 455/135
See application file for complete search history.

(56) References Cited

U.S. PATENT DOCUMENTS

| 4,829,540 | A | | 5/1989 | Waggener, Sr. et al. ........ 375/1 |
| 5,841,770 | A | * | 11/1998 | Snodgrass et al. .......... 370/346 |
| 5,887,176 | A | * | 3/1999 | Griffith et al. .............. 713/320 |
| 5,940,006 | A | * | 8/1999 | MacLellan et al. ........ 340/10.1 |
| 6,150,921 | A | * | 11/2000 | Werb et al. ................. 340/10.1 |
| 6,259,991 | B1 | * | 7/2001 | Nysen ......................... 701/300 |
| 6,407,695 | B1 | * | 6/2002 | Stierlin et al. ................ 342/42 |

FOREIGN PATENT DOCUMENTS

| EP | 0777194 | 6/1997 |
| EP | 0779520 | 6/1997 |
| FR | 2 677 135 | 12/1992 |
| FR | 2758027 | 7/1998 |
| FR | 2 776 094 | 9/1999 |
| FR | 2 776 095 | 9/1999 |
| FR | 2 776 096 | 9/1999 |
| WO | 9611455 | 4/1996 |

* cited by examiner

*Primary Examiner*—Brian Zimmerman
*Assistant Examiner*—Nam Nguyen
(74) *Attorney, Agent, or Firm*—Thelen Reid Brown Raysman & Steiner LLP

(57) ABSTRACT

A method and apparatus of information exchange between an interrogator device and a plurality of transponder devices are disclosed. Each of the transponder devices is equipped with a different binary identification code and is located in the magnetic field of the interrogator device, consisting in modifying the duration of the signals and/or the waveform of the signals transmitted by each transponder device according to the ratio between the signal transmitted by the transponder device and the ambient electromagnetic noise.

16 Claims, 5 Drawing Sheets

METHOD AND SYSTEM OF INFORMATION EXCHANGE BETWEEN AN INTERROGATOR DEVICE AND TRANSPONDER DEVICES THAT TAKES INTO ACCOUNT THE LEVEL OF AMBIENT NOISE

FIELD OF THE INVENTION

The present invention relates to a method of information exchange between an interrogator device and transponder devices, wherein the signal transmitted by the transponder devices is adapted to the ambient electromagnetic noise in the transaction.

The present invention also relates to the system implementing this method.

The present invention applies to all transactions between an interrogator device and transponder devices (or tags) whose number, identity and ambient electromagnetic noise are unknown a priori. In particular, it has applications in the field of personal badge wearer recognition, or in the field of accounting operations and controls of objects bearing electronic tags such as luggage in airports or products in a production line. The present invention also applies to stock management or to determining the list of goods contained in a supermarket trolley.

STATE OF THE ART

Many systems and methods for identifying objects bearing transponder devices (more simply called tags) are currently known to the experts. Most of them apply to multi-tag reading.

Certain of these methods propose, when a collision of messages transmitted simultaneously by the tags is detected, retransmitting the tag code after a random time specific to each tag.

Some methods consisting in leaving a specific time slot for a tag's response also exist. Each time slot is determined unequivocally by each tag's identification code. However, this method does not optimise the transaction time between the interrogator device and all of the tags.

In addition, the time required for the interrogator device to read all of the tags varies depending on the numbers of tags and the drawing of random numbers. In other words, this method is not deterministic, since it is based on drawing random numbers in addition to the random factor of the number of tags to be identified.

Another method, suited to a static set of tags that must be read only once, is described in patent application FR-A-2 677 135. This patent application explains how the device causes the tags present in the interrogator device's interrogation field to supply each identification code bit in succession until the identification code is completely identified.

For this, the tags respond to a instruction signal from the interrogator device; when a tag detects that the code currently being identified is different from its own, it inhibits itself momentarily (that is to say, it becomes "mute") so that the identification cycle continues with the other tags until only one non-inhibited tag remains. That tag's code is then identified. At the end of the identification cycle, upon on a single instruction from the interrogator device the identified tag inhibits itself definitively and the other tags lift their temporary inhibition. The identification procedure is then reinitialised in order to identify another tag. These operations are repeated until all of the tags have been separately identified.

Such a method allows the identification codes to be read systematically and deterministically.

In addition, multiple-read methods using, a signal indicating that bits set to 1 and/or 0 are present when the tags transmit are known. Such methods are notably described in the French patent applications published under numbers FR-A-2 776 094, FR-A-2 776 095 and FR-A-2 776 096.

In such methods, the interrogator determines the tags' identification codes by moving through a binary tree.

In the case where a binary tree is used, the interrogator asks the tags whether their n-position bit is set to 1 (or zero). The tags respond with a "yes" or "no" signal called the response signal.

In cases where the examination is less detailed, the interrogator asks the tags whether their following p bits have a given value (where p must be a number less than the total number of bits comprising the identification code). The tags respond in the same way as in the binary tree case, by a "yes" or "no" called the response signal.

In all these cases, the tags never transmit bit values.

In such methods, the duration of the signal transmitted by the tag is set once and for all when the systems implementing these methods are produced. In other words, the signal duration is fixed, this duration having been determined by making a compromise between the estimated electromagnetic noise generally encountered on the application site and the identification duration.

These methods are therefore deterministic methods. However, they do not necessarily optimise the total transaction time between the tags and the interrogator device as a signal's duration is set regardless of the transmission quality, that is to say regardless of the ambient level of electromagnetic noise.

DESCRIPTION OF THE INVENTION

The object of the present invention is to remedy the drawbacks in the techniques described previously. To this end, it proposes a tag identification method in which the signal transmitted by the tags is adapted according to the ambient electromagnetic noise and, more precisely, to the ratio between the transmitted signal and the ambient noise. The signal transmitted by the tag can be adapted either by adjusting the transmission duration, by modifying the waveform of the transmitted signal or by adjusting both the duration and waveform of the signal.

More precisely, the present invention relates to a method of information exchange between an interrogator device and a plurality of transponder devices, each of which is equipped with a different binary identification code and is located in the interrogator device's electromagnetic field, whereby the interrogator device transmits radio frequency (RF) signals intended to interrogate the transponder devices regarding the presence of a bit or group of bits in their identification code and in which the transponder devices transmit a response signal indicating whether or not this bit or group of bits is present. The present method is characterised in that it consists, at the beginning of the interrogation sequence, in modifying the duration of the response signals and/or the [wave]form of the response signals transmitted by each transponder device according to the ratio between the signal transmitted by the transponder device and the ambient electromagnetic noise.

The method is conveniently comprised of the following steps:

a) determining the signal-to-noise ratio between the signal transmitted by the transponder device and the ambient noise;

b) determining, from this signal-to-noise ratio, a parameter relating to the duration of the response signal from the transponder device and/or a parameter relating to the waveform of the response signal from the transponder device;

c) integrating these parameters in the interrogation signal transmitted by the interrogator device;

d) receiving by the transponder device the interrogation signal and recording these duration and/or [wave]form parameters;

e) transmitting a response signal by the transponder device during the duration recorded in d) and/or according to the [wave]form recorded in d).

In one preferred embodiment of the invention, the method consists in determining the duration parameter and/or the [wave]form parameter for the signal that is to be transmitted at the beginning of the first transponder devices interrogation sequence, whereby a sequence is a series of tag interrogations and/or transactions under the same measuring conditions.

In another preferred embodiment of the invention, the method consists in determining the duration parameter and/or [wave]form parameter at the beginning of each transponder devices interrogation sequence.

In the case of searching for the identification codes by moving through a binary tree, each transponder device is capable of transmitting two different signals, whereby each of these signals has a different waveform. In this case, the two response signals can be transmitted either over two different time slots or during the same time slot.

The present invention also relates to a system of information exchange that implements the method of the present invention. This system comprises an interrogator device and a plurality of transponder devices located in the interrogator device's electromagnetic field, whereby each of these interrogator and transponder devices comprises means of transmitting/receiving signals together with electronic means of sequencing and means of recording. This system is characterised in that each transponder device comprises a timer for recording a duration determined according to the ratio between the signal transmitted by the transponder and the ambient electromagnetic noise, and for counting a transmission time during this duration, and/or at least one shift register capable of recording a waveform determined according to the ratio between the transmitted signal and the ambient electromagnetic noise and reproducing this waveform each time a signal is transmitted.

DETAILED DESCRIPTION OF THE PREFERRED EMBODIMENTS

The object of the present invention is to provide a method of systematically identifying each tag's identification code while avoiding information retransmission, which is often one of the causes of lost efficiency in the interrogator/tags system.

For this purpose, these codes are identified while taking into account the application's ambient electromagnetic noise, that is to say the ambient electromagnetic noise in the transaction between the tags and the interrogator device.

The method of the present invention is therefore a method of managing the signals transmitted by the tags. This management seeks to adapt the signal transmitted by the tags to the application's ambient electromagnetic noise in order to improve the bit error rate and consequently the interrogator/tag system's performance, in terms of reliability and speed.

In the present invention, the signal transmitted by the tags is adapted to the ambient electromagnetic noise by adjusting either the signal's transmission duration or the signal's waveform, or else the duration and the waveform of the signal transmitted by the tags, according to the signal-to-noise ratio observed in the application. More precisely, the signal-to-noise ratio is the ratio between the signal transmitted by the transponder device to the interrogator device and the ambient electromagnetic noise in the transaction. This signal-to-noise ratio must be optimised in order to obtain a bit error rate that is sufficiently low for the system to be reliable.

The method of the present invention can therefore apply to identifying several identification codes (called multi-tag reading).

Figure 1:
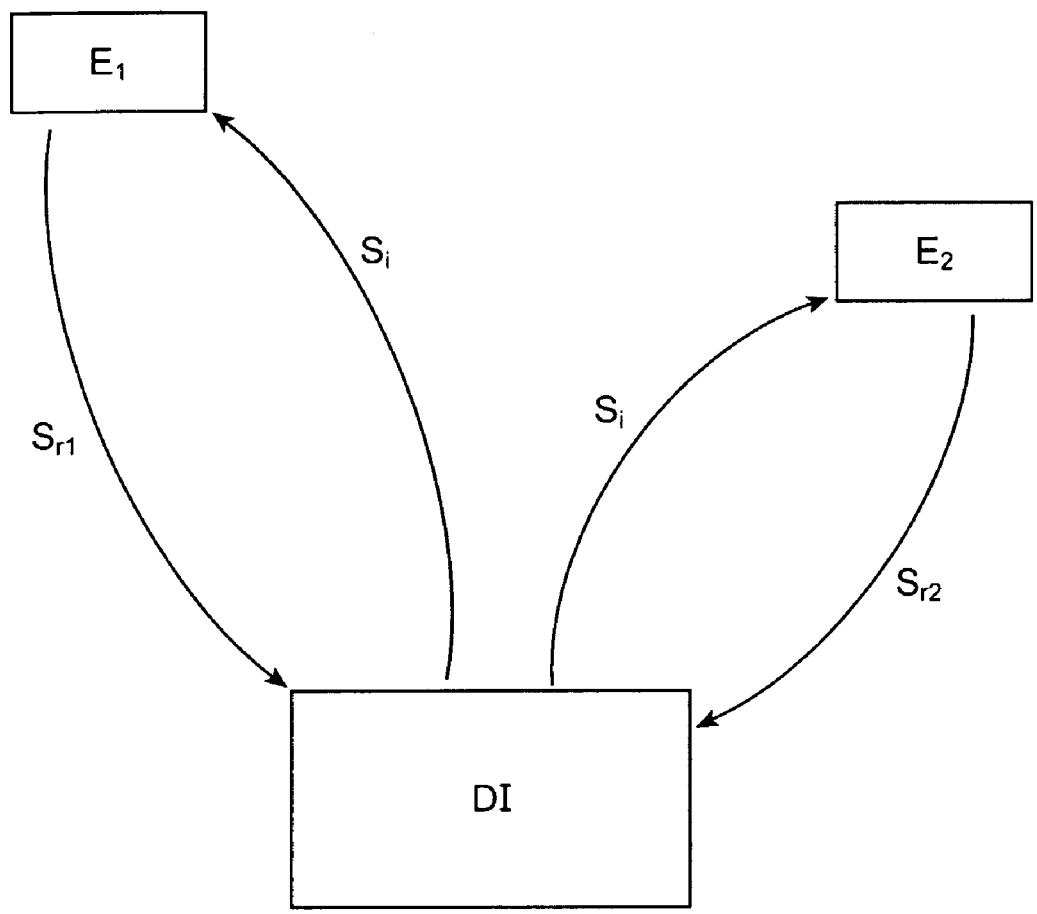
FIG. 1 shows a schematic representation of an information exchange between an interrogator device and two transponder devices (or tags)

In FIG. 1, we show the system of the present invention that enables the device that has just been fully described to be implemented. This system comprises an interrogator device, marked DI in FIG. 1, that can more simply be called the "interrogator" or "reader", and two transponder devices, called "tags", marked $E_1$ and $E_2$.

In this system comprised of the interrogator and tags, we have shown the signals transmitted between the different tags and the interrogator. Signal $S_i$ shows the signal transmitted by the interrogator device to tags $E_1$ and $E_2$; this signal $S_i$ comprises a parameter relating to the waveform of the signal to be transmitted by the tag and/or the duration that this signal must have.

The signals marked $S_{r1}$ and $S_{r2}$ show the signals transmitted by tags $E_1$ and $E_2$ in response to signal $S_i$. Both these signals $S_{r1}$ and $S_{r2}$ comprise the response by tags $E_1$ and $E_2$ to the interrogation sent by the interrogator device; these responses are transmitted with the transmission duration or waveform indicated by the parameter included in signal $S_i$.

The parameter duration and/or waveform of response signal $S_r$ is determined by the interrogator device itself, according to the detected signal-to-noise ratio. As soon as this parameter has been determined, the interrogator device sends an identification sequence start instruction.

This start instruction, which comprises the duration parameter and/or waveform parameter, is transmitted by the interrogator device to all of the tags present in the interrogator's electromagnetic field.

As we shall see in more detail later, each tag is implemented so that it can record this parameter. In the preferred embodiment in which the parameter is the signal's transmission duration, each tag comprises an internal time-switch (also called a "timer"), whose duration depends on the parameter received in the start instruction. The signal transmitted by the tag is then equal to this timer's count time.

In the case in which the start instruction parameter indicates the chosen waveform, the tag comprises a serial shift register that is used to record the waveform and reproduce it each time a message is transmitted.

According to an embodiment of the invention, each tag can comprise both an internal timer and a serial shift register used to modify either the signal duration or the signal waveform, or both parameters. Indeed, the two parameters, waveform and duration, can be used either dependently or independently.

When a tag receives the interrogation sequence start instruction sent by the interrogator device, it therefore interprets that instruction and identifies the parameter. When the value contained in this parameter is the transmission duration, this is loaded in the tag's timer, which will indicate the transmission time of the signal sent by the tag.

In the case where the tag comprises both a timer and a shift register, the timer will also provide the rhythm for the shift register containing the waveform. If the shift register is of length N, the timer's transmission time corresponds to:
  either the time required to shift through the N values, that is to say a complete shift cycle;
  or a number, integer or non-integer, of complete shift cycles.

In the case where the two parameters are used independently, the waveform may be, for example, a square clock signal, that is to say a sequence of 1 and 0 bits at a certain frequency, coupled with a duration that is independent of the duration given in the start instruction. The frequency used may be, for example, one of the subharmonics of the carrier frequency, which may be 13.56 MHz, for example.

Figure 2:
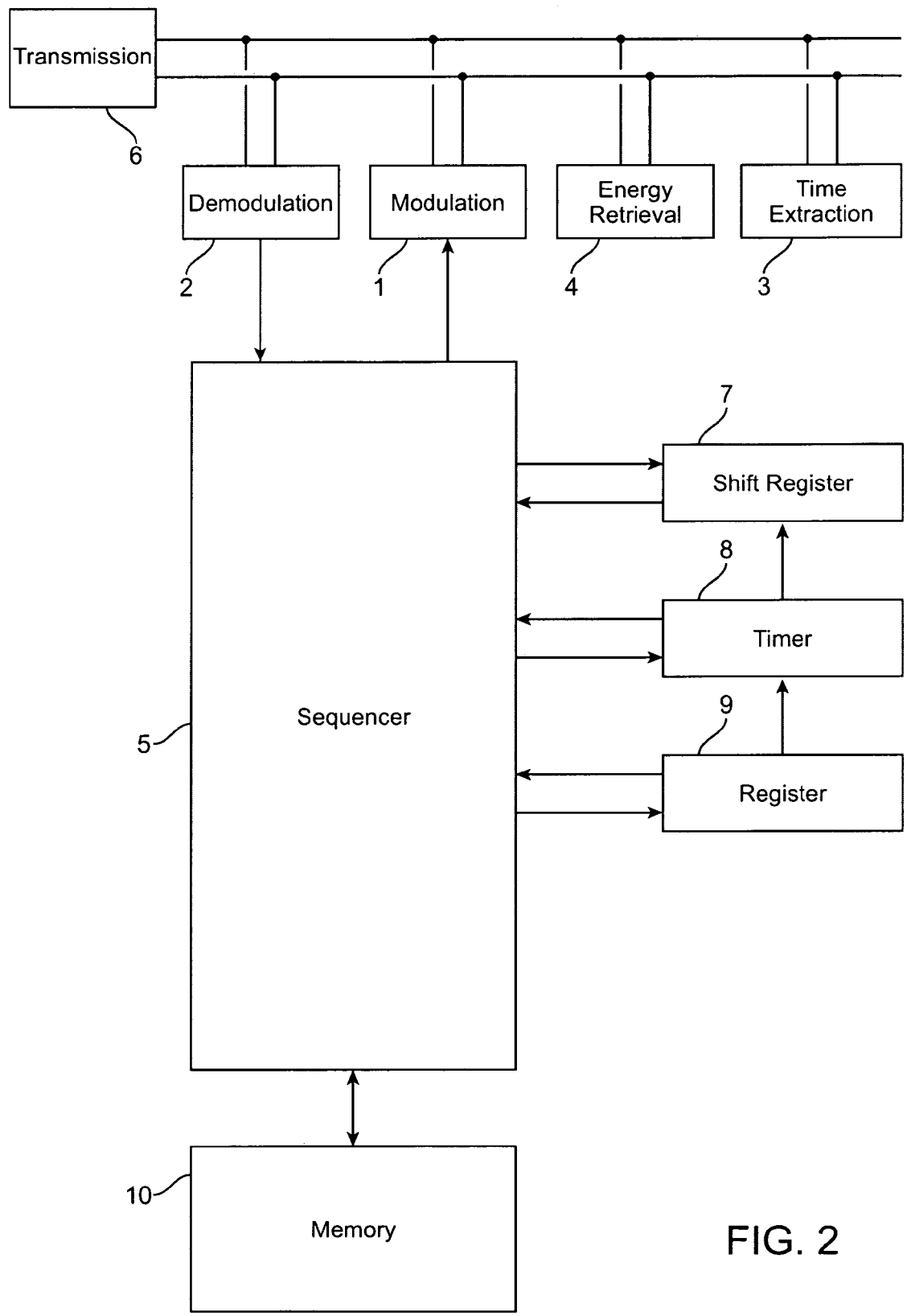
FIG. 2 shows a schematic representation of the architecture of a transponder device in the system implementing the method of the present invention when the duration of the transmitted signal is adapted.
Figure 3:
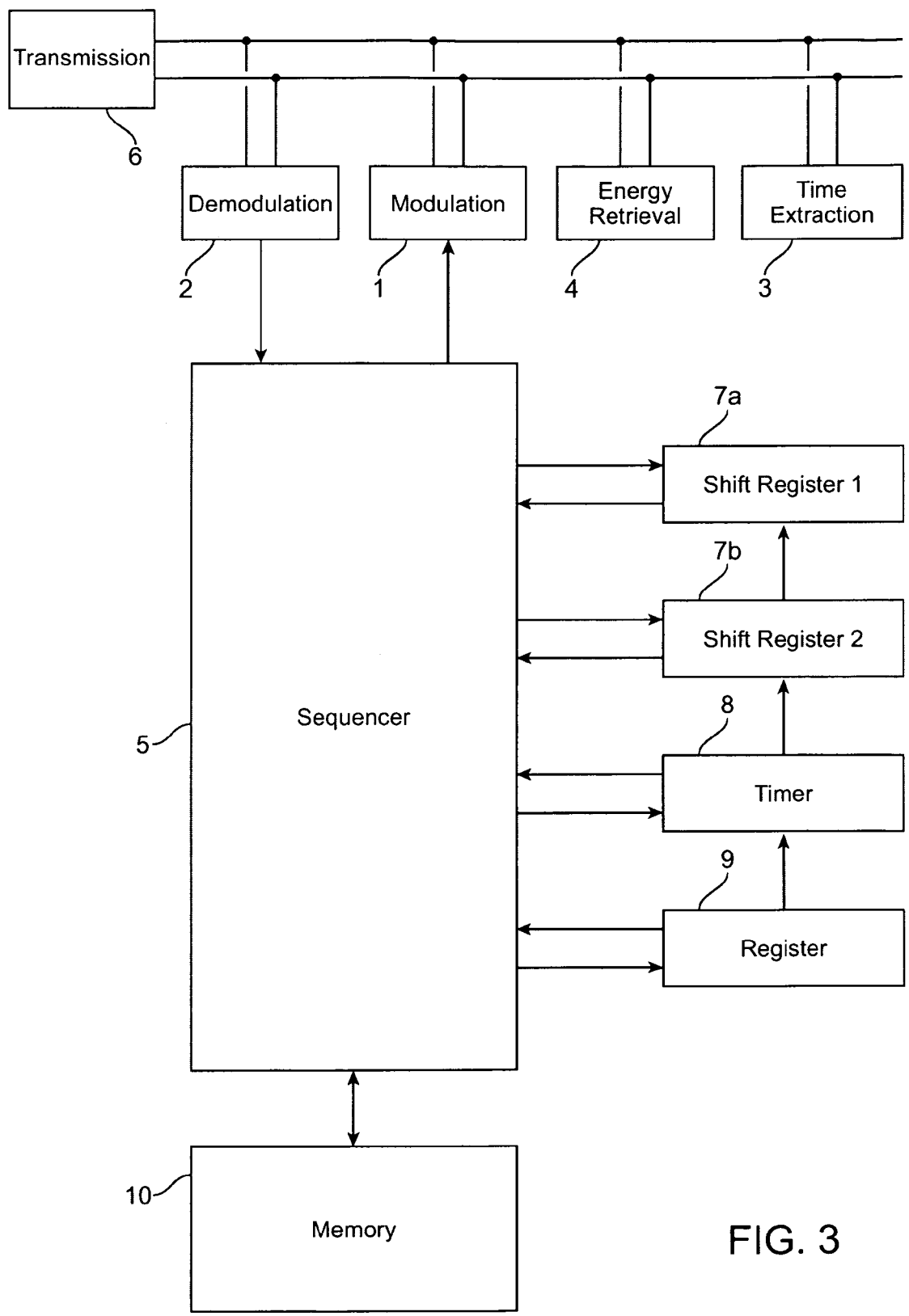
FIG. 3 shows a schematic representation of the architecture of a tag implementing the invention's method when two different waveforms are used.
Figure 4:
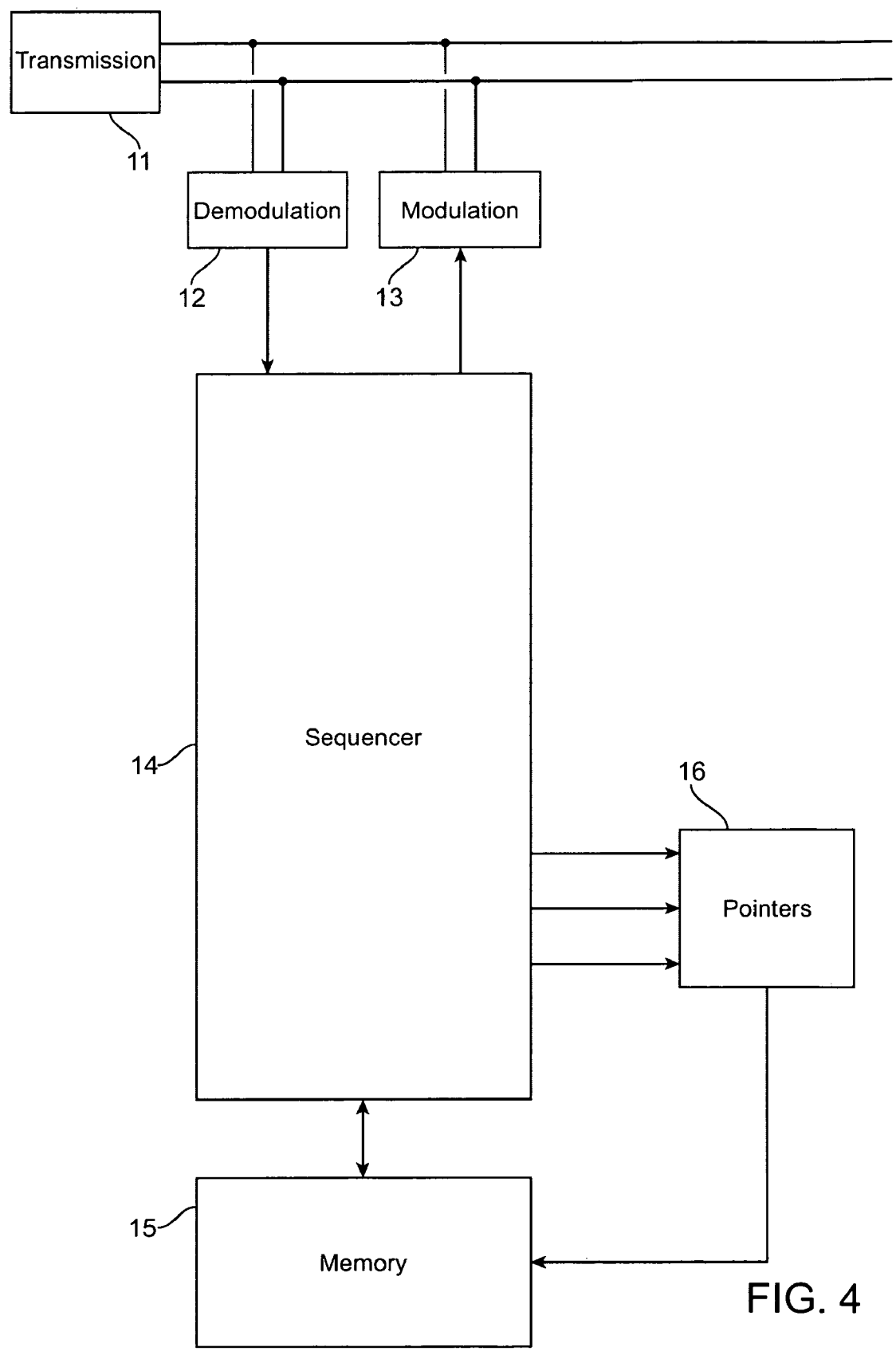
FIG. 4 shows a schematic representation of the architecture of the interrogator device in the system implementing the invention's method.

In order to better understand the method of the present invention, we have shown in FIGS. 2, 3 and 4 the functional diagrams of a transponder device and an interrogator device of the system of the present invention that is used to implement the method described previously.

More precisely, FIG. 2 shows the architecture of a tag whose structure enables the signal to be adapted both in its transmission duration and in its waveform.

For this purpose, each tag comprises electronic means of modulation 1 and electronic means of demodulation 2. Each tag additionally comprises electromagnetic means of transmission, referenced 6, that, in association with the means of modulation and demodulation, enables information exchange with the interrogator device.

Each tag additionally comprises electronic means of energy retrieval, referenced 4, and electronic means of time extraction, marked 3.

These means 1, 2, 3, 4 and 6 are currently known to the experts and are already described in patent application FR-A-2 677 135; they will therefore not be described in more detail in the present application.

Each tag also comprises means of sequencing, referenced 5, that enables it to sequence a series of actions that must be performed according to the messages received from the interrogator device. It also comprises write-protected means of recording 10 reserved for storing the tag's identification code, as well as different modules that enable it to respond to the message from the interrogator device, in order to provide it with the identification code. These modules can be, for example, those described in French patent application number FR-A-2 776 095.

Special means (8 and/or 9) are provided for in each tag in order to enable it both to interpret the start instruction sent by the interrogator device and to identify the following parameter(s): the duration parameter, the waveform parameter or at the same time, the duration and waveform parameters.

The tag, shown in FIG. 2, corresponds to the preferred embodiment in which both of the signal's parameters, duration and waveform, can be received and interpreted. The tags' transmission signals can therefore adapt in waveform or duration according to the transmission's ambient noise. In this case, the means enabling it to interpret the start instruction are:
  a storage register, marked 9, that stores the value of the duration parameter recorded in the start instruction;
  a timer 8 enabling it to time the duration of the signal to be transmitted; and
  a shift register, marked 7, enabling it to store the waveform contained in the start instruction parameter and transmit it to the modulation device. These elements 7, 8 and 9 are each linked to sequencer 5 in order to exchange information with the other elements via the sequencer.

In certain embodiments, it is possible to use two different waveforms for the tags' response signal. Indeed, in the general case where only one waveform is used, the waveform parameter contains a standard binary sequence.

In certain applications, it is useful or necessary to use two different waveforms, as is the case when searching in a binary tree, that is to say when the tags' identification codes are identified by moving through a binary tree (as described in patent application FR-A-2 776 094).

Indeed, in applications where the code is identified by moving through the binary tree, the tags must necessarily transmit the value of the code bit currently being read, that is to say they must transmit two types of signals, i.e. a 0 bit or a 1 bit. In other words, during the time slot reserved for the tags' transmissions, a tag transmits either one bit or the other, according to the value of the code bit currently being read. In this case, as two signals can be transmitted we can use two different waveforms. These two waveforms can be transmitted in several different modes, notably:
  TDMA mode with two suitable time "slots", that is to say with two consecutive time slots; in this mode, the two signals (called BiP0 and BiP1) are transmitted in succession in two consecutive time slots.
  CDMA mode with two sequences called "orthogonal" sequences; in this mode, the two signals (BiP0 and BiP1) are transmitted in the same time slot.

Figure 5:
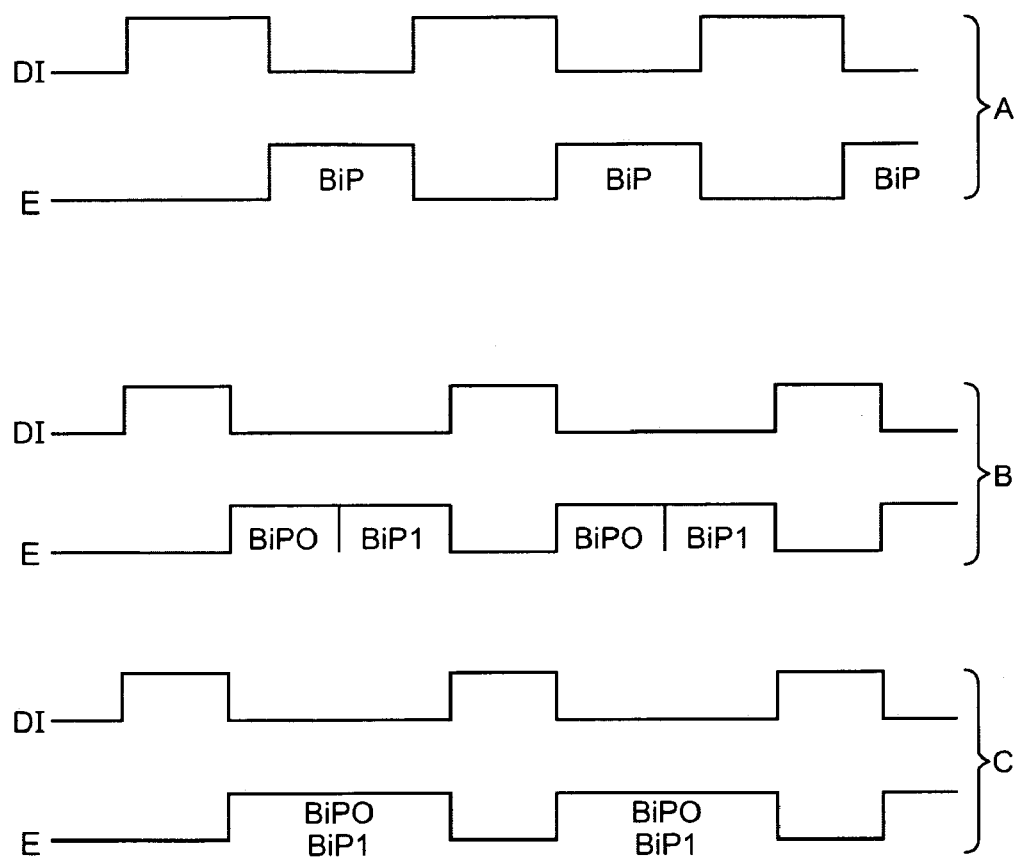
FIG. 5 shows different types of signals that can be transmitted by the tags.

In FIG. 5, we have shown temporally and schematically these different modes of signal transmission by the interrogator device on the one hand, and by the tags, on the other hand.

More precisely, part A of FIG. 5 shows the case in which a single waveform (BiP) is used for the tags' response signal. The first channel shows the signal transmitted by the interrogator device DI; the second channel shows the simple signal transmitted by the tag in response to the interrogator device.

Parts B and C of FIG. 5 show the case in which two different waveforms (BiP0, BiP1) are used for the tags' response signal. In part B, channel DI shows the signal transmitted by the interrogator device in TDMA mode and channel E shows the signals transmitted by the tags in the same TDMA mode. In part C, channel DI shows the signal transmitted by the interrogator device in CDMA mode and channel E shows the signals transmitted by the tags in the same CDMA mode.

In the embodiment just described, wherein two waveforms are used, each tag must be able to determine and interpret the two waveform parameters contained in the start instruction transmitted by the interrogator device.

This embodiment of the tag is shown in FIG. 3. In this case, the tag comprises means 1, 2, 3, 4 and 6 identical to those described for FIG. 2 and whose role is to enable the tag to communicate with the interrogator device. It also comprises a sequencer 5 and a memory 10 identical to those described for the tag in FIG. 2.

In this preferred embodiment, the tag comprises a timer 8, a storage register 9 and two shift registers, marked 7a and 7b, each used to store a waveform and transmit the recorded waveform to modulator 1.

It is also possible, in this preferred embodiment, for the tag to comprise two timers, each of which is linked to one of the two shift registers, whereby the rhythm of each shift register is provided by a different timer.

In FIG. 4, we have diagrammatically shown the architecture of an interrogator device that can be used to implement the method of the present invention. This interrogator device comprises electronic means of transmission 11, as well as electronic means of modulation 13 and demodulation 12 that enable it to send binary information to all of the tags.

This interrogator device additionally comprises electronic means of sequencing (or sequencer) 14 whose role is to sequence a series of actions that must be performed according to the messages received from the tags, as well as means 15 of storing the list of tags present in the electromagnetic field and a list pointer 16 used to point to the element currently being processed in that list.

It should however be noted that the interrogator device described above is an example interrogator device; other interrogator devices may be used to implement the method of the present invention.

The method of the present invention, described above, can operate in the following two different modes:
- a static mode in which the duration parameter and/or the waveform parameter is/are adjusted once and for all at the beginning of the application;
- a dynamic mode in which either the duration parameter or the waveform parameter, or both parameters, change at the beginning of each interrogation sequence according to the quality of the exchanges between the tags and the interrogator device.

Static mode may be used, for example, in environments in which the level of ambient electromagnetic noise is assumed to be stable (in the case of warehouse storage, for example). In this case, the duration parameter and/or the waveform parameter is/are set when the system is installed.

Dynamic mode is used in environments in which the level of electromagnetic noise is assumed to vary (when reading tags from a shopping trolley with several readers aligned that interfere with each other, for example).

In this case, a duration parameter and/or a waveform parameter is/are set when the system is installed, according to the noise observed at that time. This/these parameter(s) can then be changed at the beginning of each read cycle. Changes to the parameter(s) may be linked to analysing transmission quality, that is to say, for example, determining the number of codes with CRC (Cyclical Redundancy Check) errors, read each second. The adaptation process may therefore be led to increase or reduce the transmission time depending on the transmission quality statistics observed. The same process can result in the waveform of the transmitted signals being modified, based on the same observations.

Dynamic mode may be used, for example, when the installation is located near to a narrowband jammer. In this case, the waveform may be modified in order to distance it from the narrowband jammer if the waveform is also narrowband, which is the case when the signal is modulated, using FSK modulation, for example.

In this preferred embodiment, the interrogator device is organised in order to record the duration and the waveform of the signals currently being used (by means of recording on a hard disk, for example), in order to resume at this level, in following use.

The invention claimed is:

1. A method comprising information exchange between an interrogator device (DI) and a plurality of transponder devices ($E_1$, $E_2$), each of which is equipped with a different binary identification code and is located in the magnetic field of the interrogator device, whereby the interrogator device transmits RF signals intended to interrogate the transponder devices on the presence of a bit or of a group of bits in their identification code and in which the transponder devices transmit a response signal indicating whether or not this bit or group of bits is present, characterized in that it consists, at the beginning of the interrogation sequence, of modifying the duration of the response signals and/or the form of the response signals ($S_r$) transmitted by each transponder device according to the ratio between the signal transmitted by the transponder device and the ambient electromagnetic noise, said method comprising:
   a) determining the signal-to-noise ratio between the signal transmitted by the transponder device and the ambient noise;
   b) determining, from this signal-to-noise ratio, a parameter relating to the duration of the response signal from the transponder device or a parameter relating to the waveform of the response signal from the transponder device;
   c) integrating this/these parameter(s) in the interrogation signal transmitted by the interrogator device;
   d) receiving the interrogation signal by the transponder device and recording this/these duration and/or form parameter(s); and
   e) transmitting a response signal by the transponder device during the duration recorded in d) and/or according to the form recorded in d).

2. A method according to claim 1, which includes in determining the duration parameter and/or the waveform parameter at the beginning of the first transponder devices interrogation sequence.

3. A method according to claim 1, which includes in determining the duration parameter and/or the waveform parameter at the beginning of each transponder devices interrogation sequence.

4. A method according to claim 3, wherein each transponder device is capable of transmitting two different signals, whereby each of these signals has a different waveform.

5. A method according to claim 4, wherein the two response signals are transmitted over two different time slots.

6. A method according to claim 4, wherein the two response signals are transmitted during the same time slot.

7. A method according to claim 3, wherein the two response signals are transmitted during the same time slot.

8. A system comprising information exchange between an interrogator device (DI) and multiple transponder devices ($E_1$, $E_2$) located in the electromagnetic field of the interrogator device, whereby each of these interrogator and transponder device comprises means of transmitting/receiving signals (1-4, 6, 11-13) together with electronic means of sequencing (5, 14) and means of recording (10, 15), characterized in that each transponder device contains a timer (8) for recording a duration determined according to the ratio between the signal transmitted by the transponder device and the ambient electromagnetic noise, and for counting a transmission time during this duration, and/or at least one shift register (7) for recording a waveform determined according to the ratio between the transmitted signal and the ambient electromagnetic noise and reproducing this waveform each time a signal is transmitted, said system configured to:
  a) determine the signal-to-noise ratio between the signal transmitted by the transponder device and the ambient noise;
  b) determine, from this signal-to-noise ratio, a parameter relating to the duration of the response signal from the transponder device or a parameter relating to the waveform of the response signal from the transponder device;
  c) integrate this/these parameter(s) in the interrogation signal transmitted by the interrogator device;
  d) receive the interrogation signal by the transponder device and recording this/these duration and/or form parameter(s);
  e) transmit a response signal by the transponder device during the duration recorded in d) and/or according to the form recorded in d).

9. A method of information exchange between an interrogator device (DI) and at least one transponder device ($E_1$, $E_2$) located in the magnetic field of the interrogator device, each transponder device is equipped with a different binary identification code, whereby the interrogator device transmits RF signals intended to interrogate each transponder device on the presence of a bit or of a group of bits in their identification code and in which the transponder devices transmit a response signal indicating whether or not this bit or group of bits is present, characterized in that it consists, at the beginning of the interrogation sequence, of modifying a duration of the response signals and/or a waveform of the response signals ($S_r$) transmitted by each transponder device according to the ratio between the signal transmitted by the transponder device and the ambient electromagnetic noise, said method comprising the following steps:
  a) the interrogator device defines a parameter relative to the duration and/or the waveform of the response signals ($S_r$) of each transponder device from the analysis of the signal-to-noise ratio between the signal transmitted by the transponder device and the ambient noise;
  b) the interrogator device transmits to each transponder device a control signal to start the identification sequence, said control signal including the parameter defined in step a);
  c) on reception of said control signal, each transponder: interprets said control signal, identifies said parameter, and stores said parameter; and
  d) at least one transponder device sends a response signal the waveform and/or the duration of which is/are adjusted according to said stored parameter.

10. A method according to claim 9, further comprising determining the duration parameter and/or the waveform parameter at the beginning of the first transponder devices interrogation sequence.

11. A method according to claim 9, further comprising determining the duration parameter and/or the waveform parameter at the beginning of each transponder devices interrogation sequence.

12. A method according to claim 11, wherein each transponder device is capable of transmitting two different signals, whereby each of these signals has a different waveform.

13. A method according to claim 12, wherein the two response signals are transmitted over two different time slots.

14. A method according to claim 12, wherein the two response signals are transmitted during the same time slot.

15. A system of information exchange between an interrogator device (DI) and at least one transponder devices ($E_1$, $E_2$) located in the electromagnetic field of the interrogator device, each of these interrogator and transponder devices comprises means of transmitting/receiving signals (1-4, 6, 11-13) together with electronic means of sequencing (5, 14) and means of recording (10, 15), characterized in that:
  said interrogator device (DI) further comprises means for defining a parameter relative to a desired duration and/or waveform of the response signals ($S_r$) of each transponder device from the analysis of the signal-to-noise ratio between the signal transmitted by the transponder device and the ambient noise, said parameter being then transmitted to each transponder device within the identification sequence start control signal;
  each transponder device comprising means for interpreting said control signal, and identifying said parameter so as to transmit a response signal the waveform and/or the duration of which is/are adjusted according to said parameter.

16. A system according to claim 15, wherein each transponder device contains a timer (8) for recording a duration determined according to the ratio between the signal transmitted by the transponder device and the ambient electromagnetic noise, and for counting a transmission time during this duration, and/or at least one shift register (7) for recording a waveform determined according to the ratio between the transmitted signal and the ambient electromagnetic noise and reproducing this waveform each time a signal is transmitted.

* * * * *